United States Patent [19]

Stadnick

[11] 4,224,388
[45] Sep. 23, 1980

[54] HYDRAULIC SEAL BATTERY TERMINAL

[75] Inventor: Steven J. Stadnick, Redondo Beach, Calif.

[73] Assignee: The United States of America as represented by the Secretary of the Air Force, Washington, D.C.

[21] Appl. No.: 70,384

[22] Filed: Aug. 28, 1979

[51] Int. Cl.² .............................................. H01M 2/30
[52] U.S. Cl. .................................. 429/181; 429/183; 429/185; 174/152 R
[58] Field of Search ............................... 429/181–185, 429/171–174, 101; 174/18, 23 R, 77 R, 152 R

[56] References Cited

U.S. PATENT DOCUMENTS

| | | | |
|---|---|---|---|
| 1,796,818 | 3/1931 | Woodbridge | 429/184 X |
| 1,914,904 | 6/1933 | West | 429/183 |
| 3,370,989 | 2/1968 | Vignini | 429/183 |
| 3,427,205 | 2/1969 | Plitt et al. | 429/184 X |
| 3,678,178 | 7/1972 | Hubbauer et al. | 429/181 |

Primary Examiner—Anthony Skapars
Attorney, Agent, or Firm—Joseph E. Rusz; Arsen Tashjian

[57] ABSTRACT

A self-sealing battery terminal including a hydroformed Inconel outer case, a low shear strength sealant material, and a central post in the form of a bolt which acts as both a conductor and transmits the preload from a pair of Belleville washers to a lower ceramic washer. The lower ceramic washer acts like a piston to compress the sealant when the nut on the central post is tightened. The Belleville washers serve to maintain a minimum tension on the central post. A top ceramic washer is held in place by the tension in the central bolt as long as the tension exceeds a minimum value.

3 Claims, 1 Drawing Figure

U.S. Patent        Sep. 23, 1980        4,224,388
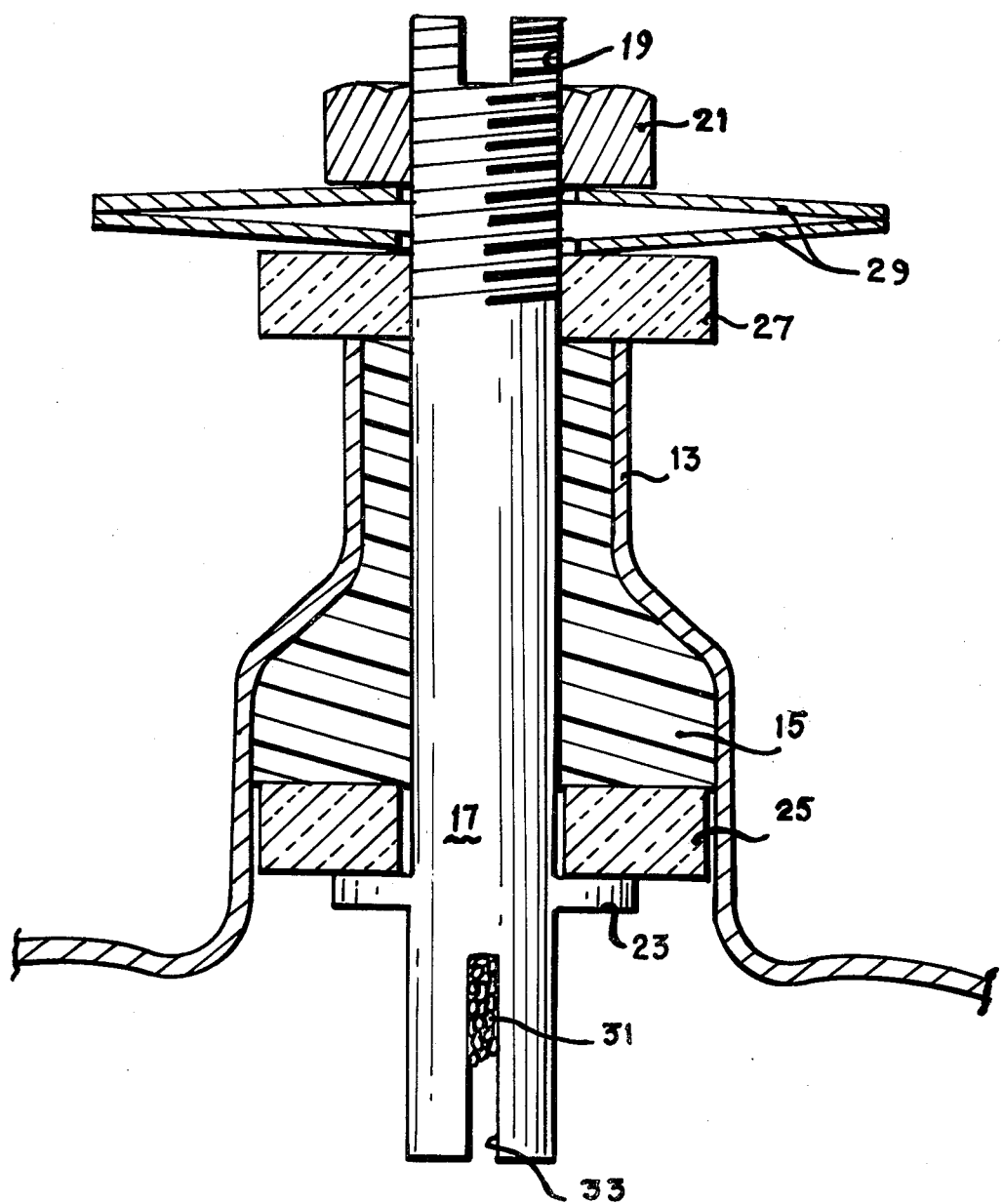

HYDRAULIC SEAL BATTERY TERMINAL

STATEMENT OF GOVERNMENT INTEREST

The invention described herein may be manufactured and used by or for the Government for governmental purposes without the payment of any royalty thereon.

BACKGROUND OF THE INVENTION

This invention relates to a self-sealing battery terminal and, more particularly, the invention is concerned with providing a hydraulic seal battery terminal for use on a nickel-hydrogen battery wherein the terminal includes an element that acts as a piston causing the sealant to flow and seal by hydrostatic pressure.

One of the problems associated with the type of batteries which are designed for use in spacecraft is the development of a satisfactory seal around the battery terminal. This is especially difficult to achieve when the battery must be designed to operate at both very low and very high temperatures because of the effect that the temperature variation has on the various component parts of the battery.

Heretofore, seals fabricated of ceramics were utilized in an attempt to achieve a satisfactory sealing arrangement. However, these seals were complicated and expensive to manufacture as well as fragile to handle and use. Another type of battery terminal called the Ziegler terminal was sometimes used. The Ziegler seals were not self-sealing and were dependent on shear stresses to form the seal. Also, a welded case and injection molding and crimping were required in the manufacture of the Ziegler type battery terminal.

Thus it can be seen that there is a great need for a self-sealing heat cyclable battery terminal seal which does not require crimping or injection molding and which is less expensive and more rugged with less chance of damage during handling and use.

SUMMARY OF THE INVENTION

The present invention is concerned with providing a self-sealing battery terminal which is suitable for use in a nickel-hydrogen battery cell. The self-sealing terminal includes a hydroformed Inconel outer case with a low shear strength sealant material disposed therein.

A central post having threads on its uppermost end acts as both a conductor and transmits the preload from Belleville washers to a lower ceramic washer which operates like a piston to compress the sealant. A top ceramic washer positioned between the Belleville washers and the upper end surface of the hydroformed battery terminal is held in place by the tension in the central bolt when the nut is threaded thereon and the Belleville washers are compressed.

Accordingly, it is an object of the invention to provide a hydraulic seal battery terminal that is less expensive and may be hydroformed from the battery shell.

Another object of the invention is to provide a self-sealing battery terminal which is not dependent on the shear strength of the sealant and may be tightened at any time to restore the sealing capability.

Still another object of the invention is to provide a battery terminal seal that is heat cyclable and may be heat cycled to provide a seal at high and low temperatures.

A further object of the invention is to provide a self sealing battery terminal which does not require crimping or injection molding.

A still further object of the invention is to provide a battery terminal seal wherein the terminal acts like a piston causing the sealant to flow and seal by hydrostatic pressure, thus being self sealing.

These and other objects, features and advantages will become more apparent after considering the following detailed description taken in conjunction with the attached drawing and appended claims.

BRIEF DESCRIPTION OF THE DRAWING

The drawing FIGURE is a plan view in side elevation of a self sealing battery terminal according to the invention showing the threaded central post which acts as both a conductor and transmits the preload to the lower ceramic washer.

DESCRIPTION OF A PREFERRED EMBODIMENT

Referring now to the drawing FIGURE, there is shown a hydroformed battery case with a sleeve 13 extending upwardly therefrom and fabricated of Inconel 718 which is an alloy composed of 78% nickel, 15% chromium and 6% iron produced by the International Nickel Company. A low shear strength sealant material 15, for example, Teflon which is tetrafluoroethylene resin substantially fills the inner area of the sleeve 13. A central post 17 in the form of a bolt having the threads 19 on the uppermost end passes vertically through the sealant material and extends upwardly beyond the top of the sleeve 13. A nut 21 threadably engages the threaded portion 19 of the post 17. The post 17 is provided with a shoulder portion 23 near the lower end thereof.

A lower ceramic washer 25 is in the lower portion of the sleeve 13 positioned on the post 17 between the sealant material 15 and the shoulder 23. An upper ceramic washer 27 is positioned around the post 17 over the sealant material 15 and against the uppermost end surface of the sleeve 13. A pair of Belleville washers 29 facing in opposite directions are positioned around the central post 17 between the nut 21 and the upper ceramic washer 27. The Belleville washers 29 provide the force which maintains a tension on the central post 17 above a minimum value if a small amount of sealant were to escape around the ceramic washers 25 and 27 at high temperatures. The plate leads 31 are welded into the central post 17 which is provided with a slot 33 to hold the leads 31.

The hydroformed Inconel outer battery case with the dome shaped sleeve 13 extending upwardly therefrom has a machined inner surface at the lower portion where it contacts the lower ceramic washer 25 so that a close tolerance fit can be achieved. The lower ceramic washer 25 acts like a piston to compress the sealant 15 and in the case of a fairly high viscosity material such as Teflon as the sealant and with a clearance of 0.001 inch, virtually no material can escape past the ceramic washers 25 within the expected temperature range. However, with a less viscous material, an additional barrier such as a piston ring could be utilized in the terminal. The upper ceramic washer 27 is held in position against the upper edge of the sleeve 13 by the tension in the central post 17 as long as the tension is maintained above the specified minimum level.

Although the invention has been illustrated in the accompanying drawing and described in the foregoing specification in terms of a preferred embodiment thereof, the invention is not limited to this embodiment. It will be apparent to those skilled in the art that certain changes, modification and substitutions can be made in the hereinbefore described invention, particularly with regard to the construction details, without departing from the true spirit and scope of the appended claims.

Having thus set forth the nature of my invention, what I claim and desire to secure by Letters Patent of the United States is:

1. A self sealing battery terminal for use on a nickel-hydrogen cell and the like, said terminal comprising a hydroformed outer case having an upwardly extending open ended dome shaped sleeve, a low shear strength sealant material substantially filling the sleeve portion of said hydroformed outer case, a central post extending vertically through said sealant material, said central post having threads on the uppermost end thereof and having a shoulder portion near the lower end thereof, a lower ceramic washer positioned in the lower end of the sleeve around said central post between the shoulder portion thereof and said sealant material, an upper ceramic washer positioned around said central post, the underside of said upper ceramic washer being in contact with the uppermost end surface of the upwardly extending sleeve, a pair of opposite facing Belleville washers positioned on the upper side of said upper ceramic washer, and a nut engaging the threads on said central post for applying a preload tension force to the post whereby the lower ceramic washer acts like a piston to compress the sealant and the Belleville washers maintain the tension above a minimum value.

2. The self sealing battery terminal defined in claim 1 wherein the hydroformed outer case having the upwardly extending open ended dome shaped sleeve is fabricated of an alloy consisting of 78% nickel, 15% chromium and 6% iron.

3. The self sealing battery terminal defined in claim 1 wherein the low shear strength sealant material is tetrafluoroethylene resin.

* * * * *